United States Patent [19]

Koster

[11] 3,912,885

[45] Oct. 14, 1975

[54] CABLE RESTORATION SYSTEM

[75] Inventor: Frederick Henry Koster, Granite Springs, N.Y.

[73] Assignee: American Telephone and Telegraph Company, New York, N.Y.

[22] Filed: Oct. 24, 1974

[21] Appl. No.: 517,401

[52] U.S. Cl. ............ 179/175.3 A

[51] Int. Cl.² ............ H04B 3/46

[58] Field of Search ............ 179/175.3 A, 175.3 R, 175.1 R, 179/175, 98; 317/99; 324/66

[56] References Cited

UNITED STATES PATENTS

| | | | |
|---|---|---|---|
| 3,375,334 | 3/1968 | Robinson | 179/175.3 R |
| 3,518,611 | 6/1970 | Shores | 179/98 |
| 3,842,219 | 10/1974 | Anderson | 179/175 |

OTHER PUBLICATIONS

"Rapid Restoral of Cable Breaks . . . " by Al Canning in *Telephone Engineer & Management*, Jan. 1, 1973.

*Primary Examiner*—Douglas W. Olms
*Attorney, Agent, or Firm*—E. J. Olinder

[57] ABSTRACT

Cable restorative systems are used for providing temporary service to customers whose cable to the central office has been damaged. In known systems, indicating devices are spliced to conductors on both sides of the cable break and are utilized in combination with a power supply to identify a service requesting line with the corresponding central office line. In an improved system utilizing the invention, the indicating devices are not directly spliced to the line but are housed in plug arrangements. Use of the plug arrangements with a plurality of board-mounted jacks eliminates the need to cut the indicating devices out of the circuit after service has been restored. In addition, a cabling and connector arrangement allows one board to be associated with each multiconductor bundle in the broken cable. After one conductor in the bundle has been identified, the connectors may be rearranged to physically associate boards corresponding to the central office and customer's side of the same bundle.

8 Claims, 6 Drawing Figures

CABLE RESTORATION SYSTEM

BACKGROUND OF THE INVENTION

This invention relates to the maintenance of multiconductor cables and in particular to service restoration of damaged multiconductor cables.

Multiconductor cables are now used extensively in telephone outside plant. Such cables typically contain as many as 2,700 subscriber lines grouped in 100-line bundles. Therefore, when a cable is damaged, the interruption to telephone service is substantial. Since many of these cables utilize pulp insulation, the conductors cannot be identified by means of color coding on the insulation. It has therefore been necessary to identify individual conductors in the cable by placing a tone source on each conductor at one end of the cable and scanning the leads at the other end of the cable with a detector. After conductors have been identified by using the tone source, a permanent splice can be made to restore service. Toning out a cable with many pairs is a time-consuming process and as a result the affected customers may be without service for many hours.

In order to avoid the long delays associated with toning-out cables, certain arrangements for providing temporary service restoration have been developed which utilize neon bulbs. Typically, such systems consist of two boards, each containing a set of neon bulbs. One board is connected to the customer side of the break and the other board is connected to the central office side of the break. A power supply and an announcement machine are also connected to the boards so that a customer whose service is interrupted by the cable break receives an announcement upon going off-hook. The announcement informs the customer that his cable has been damaged and that he should remain off-hook in order to have his service restored. The off-hook on a customer line lights a neon bulb on the board at the cable break location. A maintenance man then bridges onto the customer's line and asks the customer his directory number. After receiving the directory number, the maintenance man contacts the central office over an unused pair and requests that the central office ring the line corresponding to the directory number. When ringing is applied, a neon bulb at the cable break location associated with the central office line lights to identify the line. The identified conductors are then cut off each board and spliced together to restore service to the customer. Such a system is effective in temporarily restoring service to the customer in a fraction of the time required to tone out and permanently splice the cable. However, it is necessary to physically cut the identified conductors off of the restoral system in order to remove the restoral system from the connection. In addition, each of the boards housing the neon bulbs is equipped to handle a relatively small number of lines. If a large cable break is encountered, many such boards are needed in order to restore service. When ringing is placed on a particular line by the central office, the lighted indicator bulb might appear on any one of the boards and thus several maintenance men are needed to operate the system efficiently.

It is apparent that there is a need for a cable restoration system which does not require identified conductors to be cut off of the restoration system and which can reduce the time necessary to search for the conductors identified by light indicator devices. Accordingly, it is an object of the present invention to reduce the operating time of cable restoration systems.

It is a further object of the present invention to eliminate the need for identified conductors to be physically cut off of the restoration system.

SUMMARY OF THE INVENTION

The foregoing and other objects are achieved in accordance with the principles of the present invention in one illustrative embodiment thereof wherein a plug arrangement is utilized to house the indicating devices so that they may be removed from the circuit without physically cutting off the identified conductors. In addition, a cable and connector scheme is used to associate one set of indicating devices with a particular bundle in the damaged multiconductor cable. After one conductor in the bundle has been identified, the connector arrangement can be rearranged to physically associate the indicating devices corresponding to the same bundle in the central office end and the subscriber end of the cable break.

Specifically, a set of connector-ended restoration cables is attached to each end of the damaged cable so that one cable is connected to all of the conductors in one bundle of the damaged cable. The cables are temporarily plugged into a matrix of connectors located at the restoration system. Each connector in the matrix is associated with one indicating board which receives a set of plugs containing indicating devices such as neon bulbs or light-emitting diodes. Each board is therefore temporarily associated with one bundle of conductors in the damaged multiconductor cable. After a customer line has been identified by use of indicating devices, a cross connection can be made on a cross-connect field (which is separate from the indicating boards) to restore service to the customer. The plugs containing the indicating devices are removed to disassociate the cable restoration system from the restored line.

After one customer line and a corresponding central office line in a multiconductor bundle have been identified by use of the indicating devices, the cables which are plugged into the connector matrix may be rearranged to physically associate the boards corresponding to the central office side and the customer side of that particular bundle. Thereafter, when another customer in the identified bundle requests service, the central office line corresponding to that customer will appear on the board which is physically adjacent to the board containing the service requesting customer, thus the time required to search for the customer's central office line is substantially reduced.

DETAILED DESCRIPTION

Figure 1A:
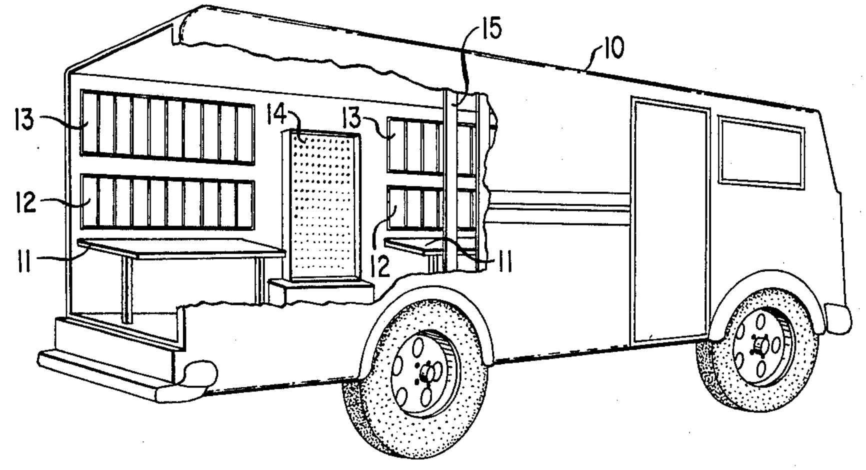
FIG. 1A shows the arrangement of FIG. 1 illustratively housed in a mobile van.
Figure 1:
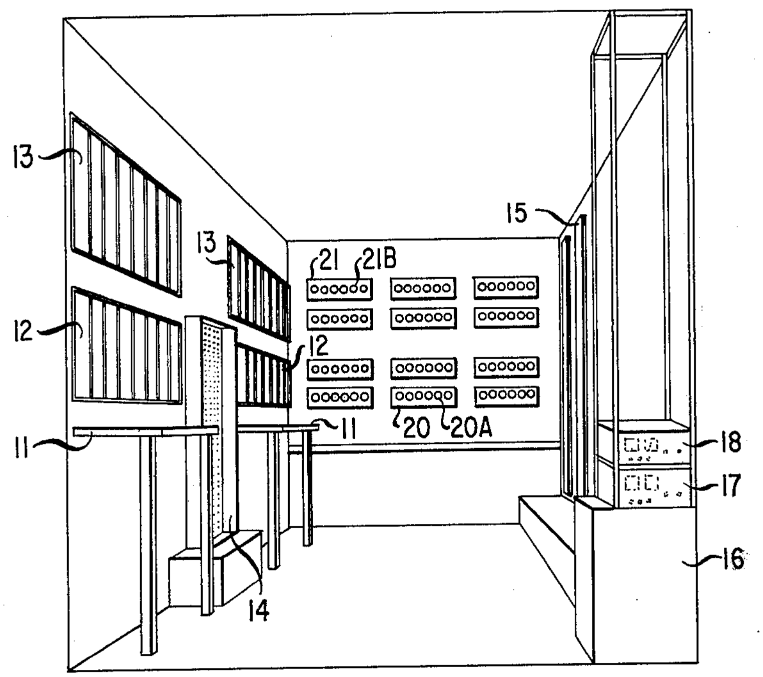
FIG. 1 of the drawing shows a specific embodiment of my invention in an illustrative arrangement.

FIG. 1 of the drawing shows an illustrative embodiment of my cable restoration system in a compact arrangement which may be rapidly transported to the site of the cable break. The basic components of the system are the indicating boards 12 and 13 which are connected to the customer side and central office side of the broken cable. Boards 12 are connected to the customer side of the break and boards 13 are connected to the central office side of the break. A test desk 11 contains dialing apparatus and a headset which is utilized by a maintenance man in order to contact the customer or the central office. After both sides of a line have been identified, a temporary cross connection is made on cross-connect field 15. A switch panel 14 is provided to disconnect power and announcement signals from the customer lines in order to facilitate testing as will hereinafter be described.

Power for the system is provided by a self-contained generator 16. Power supply 17, which is operated off of generator 16, provides the voltages necessary to operate the indicating devices on indicating panels 12 and 13. In addition, announcement machine 18 provides an announcement to all customers going off-hook. The announcement informs the customers requesting service that their line has been damaged and that if they desire service they should remain off-hook.

In addition, as shown in FIG. 1, indicating boards 12 and 13 may be connected to the ends of the broken cable by means of connector matrices 20 and 21, respectively. Each indicating board 12 is associated with one connector in matrix 20, such as connector 20A. Likewise, each indicating board 13 is associated with one connector in matrix 21, such as connector 21B. This association may be made using similar numbering on the boards and connectors or by the physical arrangement of connector matrices 20 and 21. The association of indicating bords 12 and 13 with connector matrices 20 and 21 provide a means for identifying boards corresponding to the same bundle in the damaged cable after one conductor in the bundle has been identified as will hereinafter be described.

FIG. 1A shows the system in FIG. 1 illustratively mounted in a mobile van for rapid transportation to the cable break site.

Figure 2:
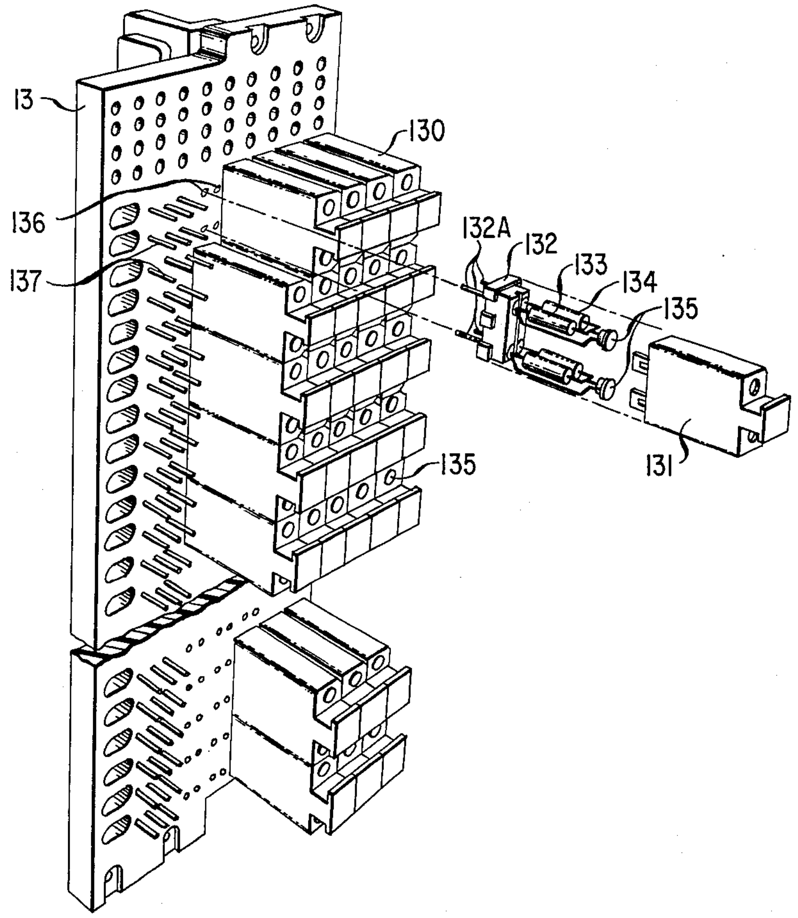
FIG. 2 is a view of the indicator boards and the associated plug arrangement.
Figure 2A:
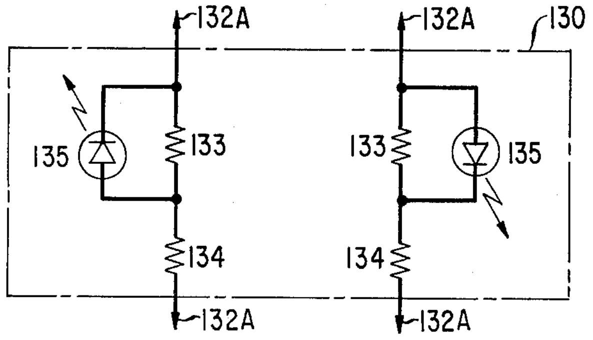
FIG. 2A is a circuit diagram for a plug arrangement used on the customer side of the cable break.
Figure 2B:
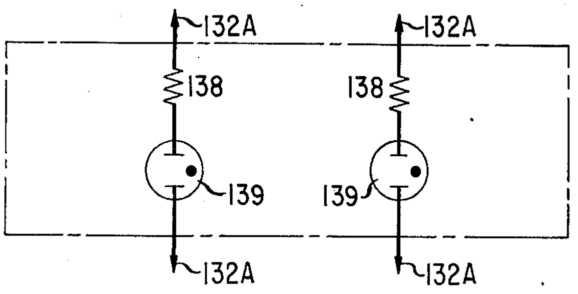
FIG. 2B is a circuit diagram for a plug arrangement used on the central office side of the cable break.

FIG. 2 shows an indicating board such as board 13 and the associated plugs 130. Indicating boards 12 used on the customer side of the break are equivalent except that the circuit arrangement in plugs 130 is slightly different as will be hereinafter described. Board 13 contains an array of pin-grip jack positions such as position 136 for receiving pins 132A on plugs 130. Positions 136 are connected to wire wrap terminals 137, which in turn may be connected by cables to connector matrices 20 and 21. Boards 13 are of well-known design which are commonly used in central office main distributing frames. These connector boards are fully described in U.S. Pat. No. 3,518,611, issued to S. C. Shores, Jr. on July 30, 1970. When boards such as connector boards 13 are used in a main distributing frame, the associated plugs 130 contain carbon blocks for protection of line circuits against voltage transients. However, in accordance with the principles of my invention, the blocks have been modified as shown in FIGS. 2A and 2B. Plugs 130, which are to be used on boards 12 connected to the customer side of the cable break, contain two indicating devices 135 and resistors 133 and 134 as shown in FIG. 2. Resistors 133 and 134 are wired into plug base 132 so that they act as a voltage divider to provide the correct operating voltage for indicating devices 135. A circuit diagram for plugs 130, used on the customer side of the cable break, is shown in FIG. 2A. Resistors 133 and 134 are arranged in a series voltage divider arrangement and a light-emitting diode (LED) 135 is connected across resistor 133 so that it may be illuminated by a voltage appearing across resistor 133. Resistors 133, 134 and diode 135 are connected to pins 132A of plug 130 so that when plug 130 is inserted into board 13 in FIG. 2, resistors 133 and 134 will be in series with one side of a telephone line, for example, the tip side. Under off-hook conditions current flowing through the tip lead will cause LED 135 to be illuminated as will be hereinafter described. The entire LED resistor combination is housed by protective cover 131. The LED devices require a substantially lower voltage for illumination than the neon bulbs used in the prior art and thus lower voltages may be used on the customer side of the line. The use of low voltages on the customer side of the cable break reduces arcing problems and hazards to maintenance personnel working on the cable.

When plugs 130 are used on boards connected to the central office side of the cable break, the circuit is modified as shown in FIG. 2B. Indicating devices 139 are neon bulbs in order to respond to central office ringing. In addition, only one resistor is required since the neon bulbs 139 require the full ringing voltage for illumination. Resistor 138 limits the current passing through bulbs 139.

Figure 3:
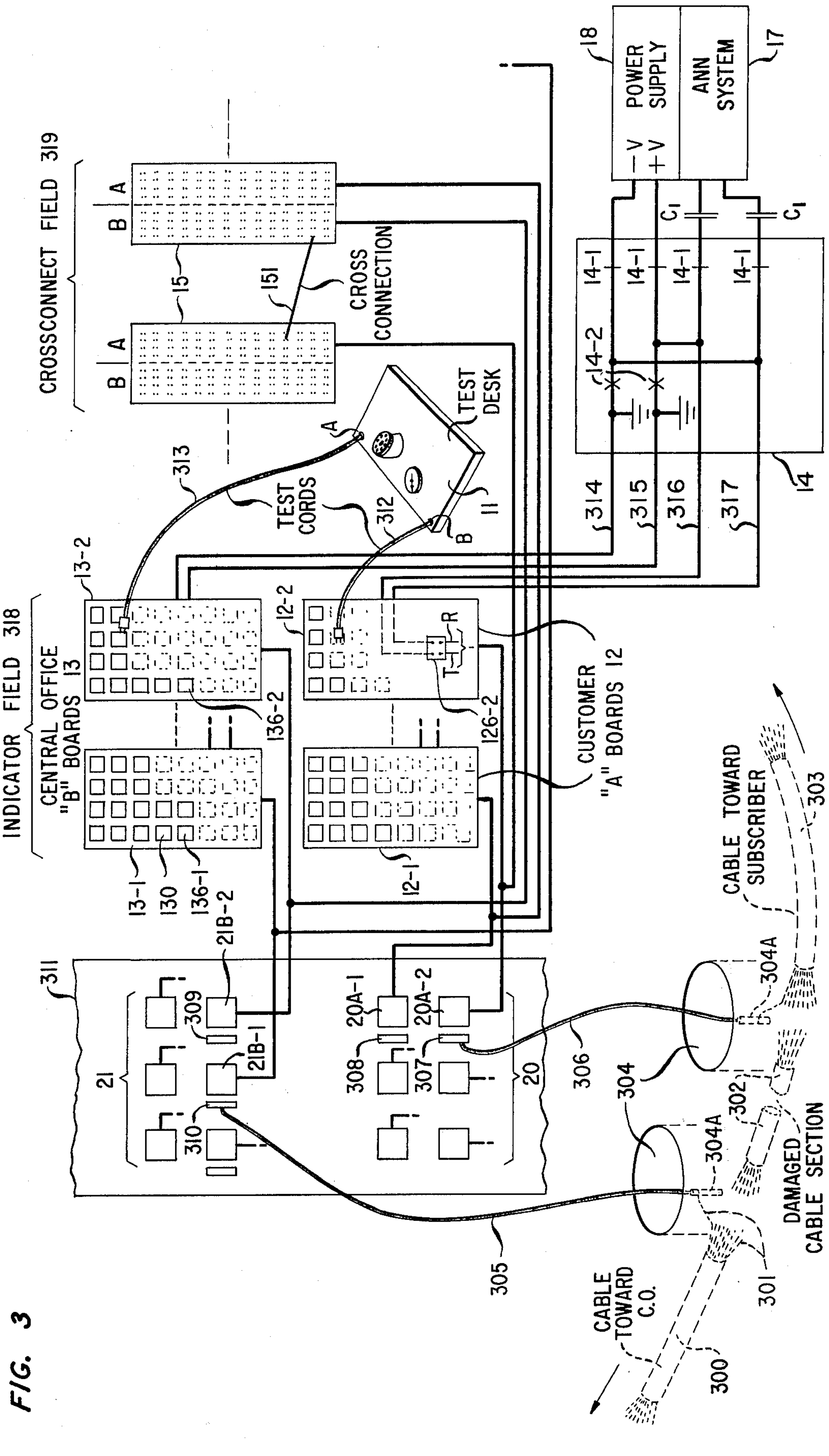
FIG. 3 is a schematic diagram of the restoration system in use repairing a damaged cable section.

The operation of my improved restoration system is best understood by referring to FIG. 3. FIG. 3 shows a schematic diagram of the cable restoration system attached to a multiconductor cable. Cable sections 300, 302 and 303 are part of an underground cable; however, aerial cables may also be serviced by means of my illustrative system. Assume, for example, that cable section 302 has been damaged by flood, fire or breakage so that all or a portion of the subscriber pairs have been severed. Cable section 302 can be accessed directly at the damaged site or on either side of the damaged section through manholes 304 as shown. The cable pairs are exposed in each manhole by means of splice closures or by cutting into the cable and the wire pairs of the cable are inserted into quick-connect terminal boards such as boards 304A. Boards 304A are of a well-known design and advantageously can receive 100 pairs. As previously described, cable sections 300, 302 and 303 may contain up to 2,700 pairs arranged in 100-pair bundles, such as bundles 301. Each pair, consisting of a tip lead and a ring lead of an individual telephone line, is inserted into terminal board 304A. According to the operation of my illustrative system, boards 304A are attached to cable sections 300 and 303 so that one 100-pair bundle is connected to each board. Terminal boards 304A are connected to restoration cables 305 and 306 which are in turn attached to connectors 310 and 307, respectively. Other restoration cables such as restoration cables 308 and 309 may be inserted into manholes 304 and connected to cable sections 303 and 300 until all conductors in cable sections 300 and 303 corresponding to damaged conductors in cable section 302 are connected to terminal boards. It should be noted that connector 307 and restoration cable 306 are associated with one bundle in cable section 303 by virtue of terminal board 304A. Likewise, connector 310 and restoration cable 305 are also associated with one 100-pair bundle in cable section 300. Connectors 307 through 310 are inserted temporarily into a matrix of connectors 311 which is separated into two groups 20 and 21. Group 20 is associated with cable section 303, which is connected to the telephone subscribers. Restoration cables and connectors, such as restoration cable 306 and connector 307, which are attached to cable section 303 are plugged into group 20. Matrix group 21 is associated with cable section 300 which is connected to the central office. Restoration cables, such as restoration cable 305 and connector 310, are plugged into section 21 of the connector matrix. At the start of the restoration procedure, it is not important that a particular cable be associated with a particular connector as long as each cable is plugged into the proper section.

The other basic components of the system include two fields of boards: indicator field 318 (consisting of customer or "A" boards 12 and central office boards or "B" boards 13) and cross-connecting field 319 consisting of boards 15. Connectors in connector group 21 such as connectors 21B-1 and 21B-2, are connected to boards 13 in indicator field 318. Connectors 20A-1 and 20A-2 in connector group 20 are connected to customer boards 12 in indicator field 318. Each of boards 12 and 13 is equipped with 100 positions for receiving plugs 130 to indicate the status of 100 lines. Each position, such as position 126-2 in boards 12-2, is equipped with four-pin jacks for receiving the four pins 132A on plugs 130 (FIG. 2). Two of the pin jacks at position 126-2 are connected to connector 20A-2, and, via connector 307 and restoration cable 306, to the tip and ring lead of one line in cable section 303. The other two positions in position 126-2 are connected via leads 316 and 317 to switch panel 14 which provides power and a recorded announcement from power supply 18 and announcement system 17. As previously described, plugs 130 contain a resistor pair and a light-emitting diode for the tip and the ring side of the customer line. When plugs 130 are inserted into positions such as position 126-2, one resistor and diode combination is inserted in series with lead 316 and the tip lead. The other is connected in series with lead 317 and the ring lead.

It should again be noted that each of boards 12 and 13 in the indicator field 318 is associated with one 100-pair bundle in cable sections 300 and 303 by virtue of its connection through connector matrix groups 20, 21, connectors 307–310 and restoration cables 306 and 305. However, at the present time the association is random, that is, a customer line appearing for example on board 12-2 might correspond to the central office line appearing on any of boards 13. Boards 12 and 13, however, may be systematically physically associated in accordance with the principles of my invention as will hereinafter be described.

Assume for the purposes of explanation that a customer in cable 303 desires service and goes off-hook. Assume also that the service-requesting customer is associated with position 126-2. When the customer goes off-hook, the light-emitting diodes in the plug at position 126-2 are both illuminated by current flowing in the circuit consisting of the negative terminal (−V) on power supply 18, contact 14-1 in switch panel 14, lead 317, position 126-2, the bulb and resistor combination in the plug associated with position 126-2, ring lead R, connector 20A-2, connector 307, restoration cable 306, terminal board 304A, the ring lead in cable section 303, the off-hook closure at the customer station, the tip lead in cable section 303, terminal board 304A, restoration cable 306, connector 307 and connector 20A-2, tip lead T, position 126-2, the resistor and diode combination at plug 130 associated with position 126-2, lead 316, contact 14-1, and the positive terminal of power supply 18 (+V). This current causes the light-emitting diode in plug 130 at position 126-2 to be illuminated on both the tip and ring sides of the line. At the same time, a recorded announcement provided by announcement system 17 is connected to position 126-2 by capacitors C1 and and leads 316 and 317. Thus a customer going off-hook hears the recorded announcement which informs him that his cable has been damaged and that he should remain off-hook to receive service.

When the light-emitting diodes at position 126-2 are illuminated, a maintenance man operating the system from test desk 11 removes plug 130 associated with position 126-2. Removal of plug 130 simultaneously removes the light-emitting diodes from the circuit and disconnects announcement system 17 from the customer line. The maintenance man then plugs into the line by means of test cord 312 and subsequently asks the customer for his directory number. After receiving the directory number, the test man plugs test cord 313 into an unused position on one of boards 13. As previously described, boards 13 are connected to the central office side of the damaged cable and thus the maintenance man at test desk 11 can establish a voice contact with a test man at the central office. The maintenance man at test desk 11 next requests that ringing be applied to the line corresponding to the directory number which he received from the customer. When ringing is applied to the desired line, the indicating lamps (neon bulbs) in plug 130 on one of boards 13 will light, identifying the line to the maintenance man at test desk 11.

As mentioned previously, the desired central office line might appear on any of boards 13 since there is no way of identifying any one particular conductor or bundle in cable section 300 prior to performing the foregoing operations. However, once one conductor in a particular bundle has been identified by the foregoing procedure, connectors 307 through 310 may be moved to physically associate boards 12 and 13 connected to corresponding bundles in the damaged cable. Advantageously, in accordance with the proposals of my invention, connectors in matrix groups 20 and 21 can be quickly and directly associated with indicating boards 12 and 13. This association may be performed by using either a numbering scheme in which corresponding board and connectors receive the same number or by means of physical arrangement so that physical location of the connectors indicates to which board they are associated. In FIG. 3, the connectors in groups 20 and 21 have been numbered to correspond with their associated indicating board. For example, in connector group 21, connector 21B-1 corresponds to the central office B board 13-1 and connector 21B-2 corresponds to board 13-2. Similarly, connectors in group 20 are numbered to correspond to boards 12. This numbering scheme is marked on the connector matrix 311. Thus, when one conductor in a particular group has been identified as described above, connectors 307 through 310 can be quickly rearranged to locate the customer board of boards 12 and the central office board of boards 13 which contain the identified conductor directly over one another. Assume, for example, that position 126-2 in board 12-2 is requesting service and has been identified by use of the indicating plugs 130. Assume further that position 136-1 on board 13-1 corresponds to the directory number associated with the service requesting customer. After this position has been identified by use of indicating plugs 130, connector 310 and connector 309 may be unplugged and interchanged, causing the desired directory number to correspond to position 136-2 on board 13-2 instead of its previous position on board 13-1. Since, as previously mentioned, each of boards 12 and 13 corresponds to a particular bundle in cable sections 303 and 300 respectively, any further conductors which are identified may be rapidly associated. For example, if another customer requests service at a location on board 12-2, the maintenance man operating the restoration system need only look at board 13-2 to detect the desired central office line since boards 13-2 and 12-2 have already been physically associated with the previously identified conductor. After a small number of initial calls, all of boards 12 and 13 will be physically associated one above the other. After this stage the operation time of the system is substantially decreased due to the fact that the maintenance man need not search all of boards 13 to find the desired central office line.

In addition, after boards 12 and 13 have been physically associated, the final step, which is a cross connection, on boards 15 to restore service to the customer is also facilitated. Boards 15 each consists of two sections, a B section and an A section corresponding to a B board and an A board, respectively. Boards 15 are multiplied to boards 12 and 13 and are arranged so that an A and B section are physically adjacent as shown in FIG. 3. After boards 12 and 13 have been associated physically, as described above, a cross connection 151 may be placed from an A section to the adjacent B section of boards 15. As shown in FIG. 3, adjacent sections in boards 15 correspond to adjacent boards 12 and 13. Thus the cross-connect wire 151 need never be longer than that required to span the space between two of boards 15. Longer cross connections and complicated patterns are therefore avoided.

In the course of performing the restoration operation described above, it may be necessary to remove power and the recorded announcement from the telephone lines in cable sections 300 and 303 and apply a ground potential instead. Ground potential may be applied by means of switches in switch panel 14 as shown in FIG. 3. In particular, switches 14-1 are opened and switches 14-2 are closed. The voltages supplied by power supply 18 are removed and replaced by ground potential. In addition, the recorded announcement provided by announcement machine 17 is uncoupled from the testing system.

What is claimed is:

1. In a cable restoration system for temporarily providing service to telephone customers whose normal service has been interrupted by a break in a cable having a plurality of multiconductor bundles connecting said customers to their serving central office, an arrangement for decreasing the operating time of said system comprising, a plurality of first restoration cables, each of said first restoration cables being respectively connectable to a multiconductor bundle at the customer-side of said break in said cable, a plurality of second restoration cable, each of said second restoration cables being respectively connectable to a multiconductor bundle at the central office-side of said break in said cable, an array of cross-connect terminals, said terminals being divided into a plurality of groups, an intermediate connection panel wired to said array for temporarily connecting each of said terminal groups to one of said first and second restoration cables, a plurality of first indicating means connected to said array of terminals for locating a conductor corresponding to a service-requesting customer in one of said conductor bundles associated with the customer-side of said break in said cable, a plurality of second indicating means connected to said array of terminals for locating a conductor corresponding to the directory number of said service-requesting customer in one of said conductor bundles associated with the said office side in said break in said cable, first visual identification means for directly associating one of said plurality of first indicating means containing said located customer conductor with one terminal group in said array, second visual identification means for directly associating one of said plurality of second indicating means containing said located central office conductor with another terminal group in said array so that said temporary connections to said restoration cables can be rearranged to place said terminal group associated with said located customer conductor physically adjacent to said terminal group associated with said located central office conductor.

2. In a cable restoration system, the arrangement according to claim 1 wherein said first indicating means further comprises a first set of indicating plugs for identifying an off-hook signal from a service-requesting customer line and a first connector board having a plurality of pin-grip positions for receiving said first set of plugs, said first connector board being attached to said terminal array.

3. In a cable restoration system, the arrangement according to claim 2 wherein said second indicating means further comprises a second set of indicating plugs for identifying a ringing signal from a central office line and a second connector board having a plurality of pin-grip positions for receiving said second set of plugs, said second connector board being attached to said terminal array.

4. In a cable restoration system, the arrangement according to claim 3 wherein said array of terminals is divided into a first field of terminals connected to said plurality of first indicating means and a second field of terminals connected to said second indicating means.

5. An arrangement for temporarily providing service to telephone customers whose normal service has been interrupted by a break in a multiconductor cable between said customers and the serving central office, said arrangement comprising, a first connector block having a plurality of pin-grip positions in rows and columns, each of said positions associated with one subscriber line in said cable;

means for connecting said first connector block to the customer-side of said break in said cable, each of said positions being connected to said associated subscriber line;

a first set of plugs, each of said plugs having a pair of low voltage indicator lights mounted therein, for insertion into said pin-grip positions in said first connector block so that one of said pair of indicator lights is connected to the tip side of said associated subscriber line and the other of said pair of indicator lights is connected to the ring side of said associated subscriber line;

a power source connected to said first connector plug for lighting said pair of low voltage indicator lights upon an off-hook signal on said associated subscriber line to indicate a service request;

means for establishing a voice connection to a service-requesting subscriber line for determining the directory number assigned thereto;

means for communicating said directory number to said central office for causing said central office to apply a ringing signal to the subscriber line associated with said directory number;

a second connector block having a plurality of pin-grip positions in rows and columns, each position associated with one subscriber line in said cable;

means for connecting said second connector block to the central office-side of said break in said cable, each of said positions in said second connector block being connected to said associated subscriber line;

a second set of plugs having a pair of high voltage indicator lights mounted therein for insertion into said pin-grip positions in said second connector block, said high voltage indicator lights being responsive to said ringing signal for indicating the position associated with said directory number; and means connected to the central office-side of said break in said cable and the customer-side of said break in said cable for cross-connecting said position in said second connector block associated with said directory number to said position in said first connector block associated with said service-requesting subscriber line to temporarily restore service to said service-requesting customer.

6. An arrangement according to claim 5 wherein said means for connecting said first connector block to the customer-side of said break in said cable further comprises a rearrangeable connector matrix connected to said first connector block for receiving a plurality of restoration cables connected to the customer-side of said break in said cable.

7. An arrangement according to claim 6 wherein said means for connecting said second connector block to the central office-side of said break in said cable further comprises a rearrangeable connector matrix connected to said second connector block for receiving a plurality of restoration cables connected to the central office-side of said break in said cable.

8. A cable restoration system having apparatus for splicing together the two ends of a broken main telephone cable in which cable central office lines and subscriber lines are arranged in bundles, said system comprising, a plurality of first cables for making connection with the broken ends of said bundles in said cable toward said central office and a plurality of second cables for making connection to the broken ends of said bundles in said cable toward said subscribers;

a subscriber's panel associated with said system for each bundle corresponding to said subscribers;

a central office panel associated with said system for each bundle corresponding to said central office;

an intermediate connection panel for connecting any of said central office bundles to any of said central office panels; and means for identifying one conductor in one of said bundles in said cable toward said central office and one conductor in one of said bundles in said cable toward said subscriber whereby sufficient information is obtained to rearrange the connections on said intermediate panel so that the subscriber panel and the central office panel for corresponding bundles in said cable may be juxtaposed adjacently to one another.

* * * * *